(12) United States Patent
Ahmed et al.

(10) Patent No.: US 11,976,822 B2
(45) Date of Patent: May 7, 2024

(54) COMBUSTION CHAMBER FOR PELLET GRILLS

(71) Applicant: W.C. BRADLEY CO., Columbus, GA (US)

(72) Inventors: Mallik Ahmed, Columbus, GA (US); Bruce Roberts, Midland, GA (US); Ramin Khosravi Rahmani, Columbus, GA (US); Anthony Hamilton, Hamilton, GA (US); Sleiman Abdallah, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 0 days.

(21) Appl. No.: 16/805,352

(22) Filed: Feb. 28, 2020

(65) Prior Publication Data

US 2020/0333011 A1  Oct. 22, 2020

Related U.S. Application Data

(60) Provisional application No. 62/811,743, filed on Feb. 28, 2019.

(51) Int. Cl.
*F24B 13/04* (2006.01)
*A47J 37/07* (2006.01)
*F24B 13/02* (2006.01)
*F23B 30/00* (2006.01)

(52) U.S. Cl.
CPC ........... *F24B 13/04* (2013.01); *A47J 37/0704* (2013.01); *A47J 37/0786* (2013.01); *F24B 13/02* (2013.01); *F23B 1/38* (2013.01)

(58) Field of Classification Search
None
See application file for complete search history.

(56) References Cited

U.S. PATENT DOCUMENTS

| | | | |
|---|---|---|---|
| 2,910,930 | A | 11/1959 | Hankoff |
| 3,017,954 | A | 1/1962 | Kruckewitt |
| 3,606,066 | A | 9/1971 | Anderson |
| 3,623,422 | A | 11/1971 | Marshall |
| 4,810,510 | A | 3/1989 | Lever et al. |

(Continued)

FOREIGN PATENT DOCUMENTS

| | | |
|---|---|---|
| AT | 402850 B | 9/1997 |
| CN | 102345861 A | 2/2012 |

(Continued)

OTHER PUBLICATIONS

May 7, 2020, Publisher: International Search Report issued by the ISA/US for PCT/US2020/020487 dated May 7, 2020.

(Continued)

*Primary Examiner* — Jason Lau
(74) *Attorney, Agent, or Firm* — GableGotwals; David G. Woodral (57) ABSTRACT

A combustion chamber has an inner wall defining an inner chamber. The inner wall is perforated to admit combustion air into the inner chamber. The combustion chamber has an outer wall defining an outer chamber. The outer wall is perforated to admit combustion air from a pressurized air plenum to the inner wall. The inner and outer wall are spaced apart such that air may flow between the inner and outer walls.

11 Claims, 6 Drawing Sheets

(56) References Cited

U.S. PATENT DOCUMENTS

| | | | |
|---|---|---|---|
| 4,823,684 A | 4/1989 | Traeger et al. | |
| 4,909,235 A | 3/1990 | Boetcker | |
| 4,966,126 A | 10/1990 | Wu | |
| 5,197,379 A | 3/1993 | Leonard, Jr. | |
| 5,251,607 A | 10/1993 | Traeger et al. | |
| 5,375,540 A | 12/1994 | Verrecchia et al. | |
| 5,423,430 A | 6/1995 | Zaffiro et al. | |
| 5,429,110 A | 7/1995 | Burke et al. | |
| 5,490,452 A | 2/1996 | Schlosser et al. | |
| 5,809,991 A | 9/1998 | Pai | |
| 5,941,234 A | 8/1999 | Norburn et al. | |
| 6,187,359 B1 | 2/2001 | Zuccarini | |
| 6,209,533 B1 | 4/2001 | Ganard | |
| 6,223,737 B1 | 5/2001 | Buckner | |
| 6,314,955 B1 | 11/2001 | Boetcker | |
| 6,336,449 B1 * | 1/2002 | Drisdelle | F24B 1/024 110/165 R |
| 7,360,639 B2 | 4/2008 | Sprouse et al. | |
| 7,530,351 B2 | 5/2009 | Leverty | |
| D623,013 S | 9/2010 | Alden et al. | |
| 7,900,553 B1 | 3/2011 | Maurin | |
| 7,984,709 B1 | 7/2011 | Byrnes et al. | |
| 8,006,686 B2 | 8/2011 | Hunt et al. | |
| 8,267,078 B2 | 9/2012 | Kuntz | |
| D681,394 S | 5/2013 | Parel et al. | |
| 8,651,018 B1 | 2/2014 | Loud, III | |
| 8,899,145 B2 | 12/2014 | Harrison et al. | |
| 8,985,092 B2 | 3/2015 | Ahmed | |
| D760,539 S | 7/2016 | Colston | |
| 9,427,108 B2 | 8/2016 | Ahmed | |
| 9,441,838 B2 | 9/2016 | Baker | |
| 9,635,978 B2 | 5/2017 | Measom et al. | |
| 9,759,429 B2 | 9/2017 | Tucker | |
| 9,814,354 B2 | 11/2017 | McAdams et al. | |
| 9,913,559 B2 | 3/2018 | Polter et al. | |
| D817,091 S | 5/2018 | Colston | |
| 10,077,904 B2 * | 9/2018 | Grant | F24B 1/024 |
| 10,201,247 B1 | 2/2019 | Jones | |
| 10,292,531 B1 | 5/2019 | Hancock et al. | |
| 10,495,317 B1 | 12/2019 | Hancock et al. | |
| D871,821 S | 1/2020 | Boltz et al. | |
| D901,244 S | 11/2020 | Baker et al. | |
| D907,424 S | 1/2021 | Measom et al. | |
| D915,138 S | 4/2021 | Bennion et al. | |
| D921,413 S | 6/2021 | Fitzpatrick | |
| D927,917 S | 8/2021 | Yueh | |
| D935,840 S | 11/2021 | Carter et al. | |
| 11,166,590 B2 | 11/2021 | Zheng | |
| 11,181,276 B2 | 11/2021 | Colston et al. | |
| 11,181,277 B2 | 11/2021 | Donnelly et al. | |
| 11,206,948 B2 | 12/2021 | Measom et al. | |
| 11,231,178 B2 | 1/2022 | James | |
| D945,208 S | 3/2022 | Duan et al. | |
| 11,359,817 B2 | 6/2022 | Donnelly et al. | |
| 2001/0017131 A1 | 8/2001 | Sim | |
| 2004/0226550 A1 | 11/2004 | Hutton et al. | |
| 2004/0255926 A1 | 12/2004 | Waits et al. | |
| 2005/0126556 A1 | 6/2005 | Bossler | |
| 2008/0085172 A1 | 4/2008 | Harman et al. | |
| 2008/0098906 A1 | 5/2008 | Davis | |
| 2009/0013985 A1 | 1/2009 | Little et al. | |
| 2009/0056695 A1 | 3/2009 | Cosgrove | |
| 2009/0293860 A1 | 12/2009 | Carlson | |
| 2010/0218754 A1 | 9/2010 | Kuntz | |
| 2011/0073101 A1 | 3/2011 | Lau et al. | |
| 2011/0136066 A1 | 6/2011 | Geselle et al. | |
| 2011/0275023 A1 | 11/2011 | Knight | |
| 2013/0160757 A1 | 6/2013 | Atemboski et al. | |
| 2013/0298894 A1 | 11/2013 | Kleinsasser | |
| 2013/0327259 A1 | 12/2013 | Freeman | |
| 2014/0326232 A1 | 11/2014 | Traeger | |
| 2014/0326233 A1 | 11/2014 | Traeger | |
| 2014/0373827 A1 | 12/2014 | Zhu et al. | |
| 2014/0377431 A1 | 12/2014 | Kazerouni | |
| 2015/0079250 A1 | 3/2015 | Ahmed | |
| 2015/0136109 A1 | 5/2015 | Baker | |
| 2015/0182074 A1 | 7/2015 | Bucher et al. | |
| 2015/0320259 A1 | 11/2015 | Tucker | |
| 2016/0174767 A1 | 6/2016 | Schlosser et al. | |
| 2016/0245529 A1 | 8/2016 | McClean | |
| 2016/0255999 A1 | 9/2016 | McAdams et al. | |
| 2016/0327263 A1 | 11/2016 | Traeger | |
| 2016/0341423 A1 * | 11/2016 | Johnson | C10B 47/44 |
| 2016/0353706 A1 | 12/2016 | Gallagher et al. | |
| 2017/0065124 A1 | 3/2017 | Colston | |
| 2017/0067649 A1 | 3/2017 | Colston | |
| 2017/0164783 A1 | 6/2017 | Sauerwein et al. | |
| 2017/0196400 A1 | 7/2017 | Colston | |
| 2017/0198917 A1 | 7/2017 | Gillespie et al. | |
| 2017/0219213 A1 | 8/2017 | Measom et al. | |
| 2017/0289257 A1 | 10/2017 | Colston | |
| 2017/0343218 A1 | 11/2017 | Tucker | |
| 2017/0370592 A1 | 12/2017 | Bogazzi | |
| 2018/0028018 A1 | 2/2018 | Barnett | |
| 2018/0031246 A1 * | 2/2018 | Barford | F24B 1/191 |
| 2018/0168397 A1 | 6/2018 | Colston | |
| 2018/0192822 A1 | 7/2018 | Cedar et al. | |
| 2018/0213970 A1 | 8/2018 | Colston | |
| 2018/0296031 A1 | 10/2018 | Terrell, Jr. et al. | |
| 2018/0317707 A1 | 11/2018 | Dahle | |
| 2018/0368617 A1 | 12/2018 | Allmendinger | |
| 2018/0368618 A1 | 12/2018 | Meason et al. | |
| 2019/0008321 A1 | 1/2019 | Allmendinger | |
| 2019/0282032 A1 | 9/2019 | Colston et al. | |
| 2019/0290064 A1 | 9/2019 | Colston et al. | |
| 2019/0290066 A1 | 9/2019 | Colston | |
| 2019/0293295 A1 | 9/2019 | Colston et al. | |
| 2019/0365152 A1 | 12/2019 | Dahle et al. | |
| 2019/0374065 A1 | 12/2019 | Hancock et al. | |
| 2019/0387924 A1 | 12/2019 | Zheng | |
| 2020/0086780 A1 | 3/2020 | Baker et al. | |
| 2020/0116349 A1 | 4/2020 | Rahmani et al. | |
| 2020/0158337 A1 | 5/2020 | Baker et al. | |
| 2020/0214501 A1 | 7/2020 | Gafford et al. | |
| 2020/0237148 A1 | 7/2020 | Donnelly | |
| 2020/0333011 A1 | 10/2020 | Ahmed et al. | |
| 2021/0267413 A1 | 9/2021 | Roberts et al. | |
| 2021/0298333 A1 | 9/2021 | Strong et al. | |
| 2021/0341144 A1 | 11/2021 | Parsons et al. | |
| 2021/0356130 A1 | 11/2021 | Li | |
| 2021/0361115 A1 | 11/2021 | Colston et al. | |
| 2022/0046937 A1 | 2/2022 | Simon et al. | |
| 2022/0082262 A1 | 3/2022 | Colston et al. | |

FOREIGN PATENT DOCUMENTS

| | | | |
|---|---|---|---|
| CN | 203549790 U | 4/2014 | |
| CN | 103989414 B | 5/2016 | |
| DE | 102009014010 A1 * | 10/2010 | F23B 10/00 |
| DE | 4020171009570011 S | 6/2018 | |
| EP | 19871042.8 | 5/2022 | |
| EP | 22150610.8 | 6/2022 | |
| EP | 20763840.4 | 10/2022 | |
| KR | 100752761 B1 * | 8/2007 | |
| KR | 20090119121 A | 11/2009 | |
| WO | 2013116946 A1 | 8/2013 | |
| WO | 2017044598 A1 | 3/2017 | |
| WO | 2017064528 A1 | 4/2017 | |
| WO | 2018125681 A1 | 7/2018 | |
| WO | 2018208919 A1 | 11/2018 | |
| WO | PCT/US2020/035535 | 10/2020 | |
| WO | PCT/US2021/020303 | 5/2021 | |

OTHER PUBLICATIONS

Rider 900 Pellet Grill—Product Walkthrough, first available Feb. 19, 2020, YouTube, [online], [site visited Jan. 24, 2022], Available from internet URL: https://www.youtube.com/watch?v= 3gBOTUUe22k (Year: 2020).

Char-Broil_ W.C. Bradley Co, W.C. Bradley, [online], [site visited Jan. 24, 2022], Available from internet URL: https://www.wcbradley. com/divisions/char-broil (Year: 2022).

(56) References Cited

OTHER PUBLICATIONS

Rider 900 Pellet Grill, Oklahoma Joes, [online], [site visited Jan. 24, 2022], Available from internet URL: https://www.oklahomajoes.com/rider-900-pellet-grill (Year: 2022).

National Intellectual Property Administration, P.R. China Search Report; Application No. 202080032060.5; W.C. Bradley Co.

* cited by examiner

COMBUSTION CHAMBER FOR PELLET GRILLS

CROSS-REFERENCE TO RELATED CASES

This application claims the benefit of U.S. provisional patent application Ser. No. 62/811,743, filed on Feb. 28, 2019, and incorporates such provisional application by reference into this disclosure as if fully set out at this point.

FIELD OF THE INVENTION

This disclosure relates to pellet fueled grills in particular and, more specifically, to combustion chambers used in pellet fueled grills.

BACKGROUND OF THE INVENTION

Early examples of outdoor wood pellet fired cooking and smoking appliances are disclosed in U.S. Pat. Nos. 4,823,684 and 5,251,607 to Traeger, et al. Over the years there have been some improvements and variations of these products made but their essential principal of operation remains the same. Issues can arise internally with respect to handling and combustion of the wood fuel pellets. Combustion air must reach the fuel pellets, but prior firepot design can result in blockage of air intake holes. Intake holes may be blocked owing to pellet arrangement in the firepot, ash or debris clogging the holes, or from other causes. This can result in unacceptably low heat output and even extinguishing of the firepot altogether. Additionally, in smoldering or other modes of operation, unburned hydrocarbons may escape the firepot in gaseous form and be subject to unwanted ignition elsewhere. Further uneven air flow into a firepot may result in hot or cold spots and areas of fuel that are not burned. On the other hand, fuel maybe consumed where it is not intended, such as in the fuel feeding mechanism or other conveyance means.

What is needed is a system and method for addressing the above, and related, issues.

SUMMARY OF THE INVENTION

The invention of the present disclosure, in one aspect thereof a combustion chamber having an inner wall defining an inner chamber. The inner wall is perforated to admit combustion air into the inner chamber. The combustion chamber has an outer wall defining an outer chamber. The outer wall is perforated to admit combustion air from a pressurized air plenum to the inner wall. The inner and outer wall are spaced apart such that air may flow between the inner and outer walls. The inner chamber has an open top to receive solid fuel for combustion in the inner chamber.

In some embodiments, the combustion chamber further comprises a funnel above the inner chamber configured to direct solid fuel into the inner chamber. The inner and outer chamber may be bounded by a common floor. The outer wall may have perforations at least above the inner wall and on a same vertical level as the inner wall. The outer wall may also have perforations vertically above the funnel.

In some embodiments the combustion chamber further comprises a perforated floor in the inner chamber. Such floor may have a ramped segment of the perforated floor on an opposite side of the inner chamber from a location where the solid fuel is introduced. An ash chamber may be below the perforated floor. In some cases, a lower outer chamber extension is defined by a lower outer wall extension and contains the ash chamber therein. Some embodiments include a spaced apart region between the ash chamber and the lower outer chamber extension with a lip extending inwardly to trap debris in the spaced apart region. A removable cap may be placed at a bottom end of the ash chamber.

The invention of the present disclosure, in another aspect thereof, comprises a cooking grill having a cooking chamber with a cooking grate supported therein that is accessible by an openable lid. The grill may have a firepot within the cooking chamber below the cooking grate, an air plenum providing pressurized combustion air to the firepot, and a fan that pressurizes the air in the plenum. The firepot further comprises an inner wall defining an inner chamber where fuel is combusted and an outer chamber wall defining an outer chamber containing the inner chamber. The outer chamber wall is affixed within the plenum and receives pressurized air from the plenum. The inner and outer walls are spaced apart such that air may flow freely around the inner chamber within the outer chamber. The inner chamber is perforated to receive the combustion air from the outer chamber.

The grill may have a perforated floor below the inner chamber and may have an ash compartment below the perforated floor. A fuel feeding mechanism may traverse through the plenum and pass through the outer chamber wall delivering fuel into a top of the inner chamber. A funnel may be provided on the inner chamber wall directing solid fuel into the inner chamber from the fuel feeding mechanism. The perforated floor may comprise a ramped segment and a flat segment, the ramped segment being oriented to direct fuel pellets from the fuel feeding mechanism toward the flat segment.

The invention of the present disclosure, in another aspect thereof, comprises a cooking grill having a cooking chamber containing a cooking grate, and a firepot below the cooking grate that is situated at least partially within an air plenum providing pressurized air to the firepot. The firepot has an outer chamber defined by a perforated outer chamber wall in fluid contact with the pressurized air in the plenum. The firepot has an inner chamber within the outer chamber and defined by a perforated inner chamber wall, the inner chamber wall perforations being sized to prevent passage of unburned fuel pellets therethrough but to admit air flow from the outer chamber therethrough.

The grill may include a perforated floor below the inner chamber allowing ash to fall from the inner chamber to an ash chamber at least partially below the plenum. It may also include a fuel feeding mechanism passing through part of the plenum and through the outer chamber wall and situated to provide fuel into a top of the inner chamber.

DETAILED DESCRIPTION OF THE PREFERRED EMBODIMENTS

Figure 1:
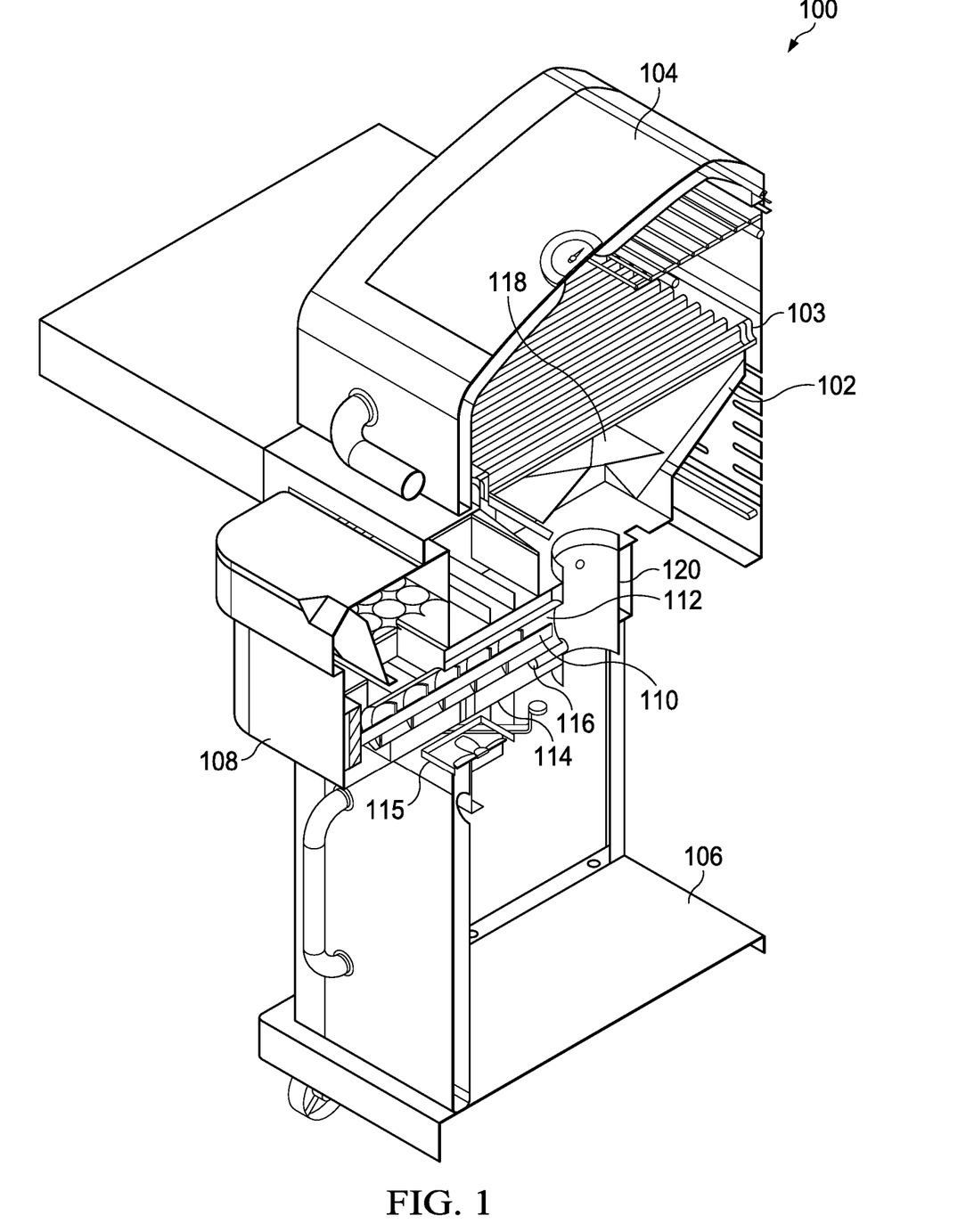
FIG. 1 is a perspective cutaway view of a pellet grill.

Referring now to FIG. 1, a perspective cutaway view of a pellet grill 100 is shown. The pellet grill 100 may be of the type that utilizes pelletized fuel comprising wood, sawdust, or other components rendered into pelletized form for handling and combustion by the grill 100 for cooking or smoking operations. The pellet burning cooking grill 100 provides a firebox or cooking chamber 102 containing or supporting a cooking grate 103. An openable or hinged lid 104 may be provided for selective access to the cooking grate 103. A fuel feeding mechanism 110 (shown here as an auger but may also be, for example and without limitation, a belt conveyor, stick/slip conveyor, push feeder or other fuel feeding mechanism) may transport compressed wood pellets or other pelletized fuel from an exterior hopper 108 to a typically open top cylindrical firepot or combustion chamber 120. The combustion chamber 120 may be supplied with combustion air pressurized and driven by a fan through ductwork or a plenum 114 to an area surrounding the firepot 120 and then through holes in the exterior of the firepot feeding air into an inner combustion space. In some configurations, the auger 110 operates in an auger tube 112 that is at least partially inside the plenum 114.

An electric resistance igniter 116 may initiate combustion of the fuel inside the combustion chamber 120. Hot gas from the combustion chamber 120 may be conveyed through a series of baffles 118 to the cooking grate 103 placed above the combustion chamber 120.

Figure 2:
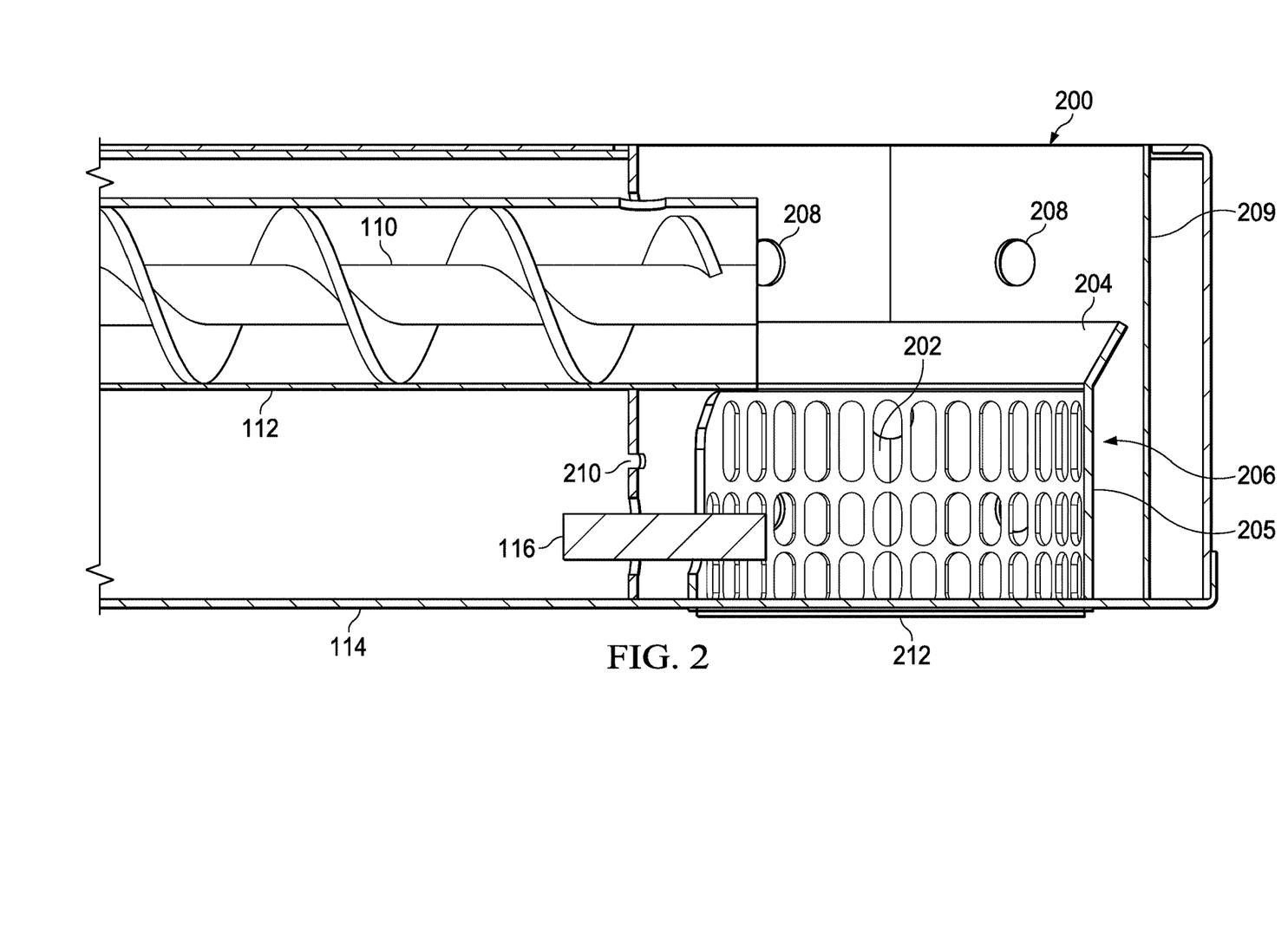
FIG. 2 is a side cutaway view of a combustion chamber for a pellet grill or other device according to aspects of the present disclosure.
Figure 3:
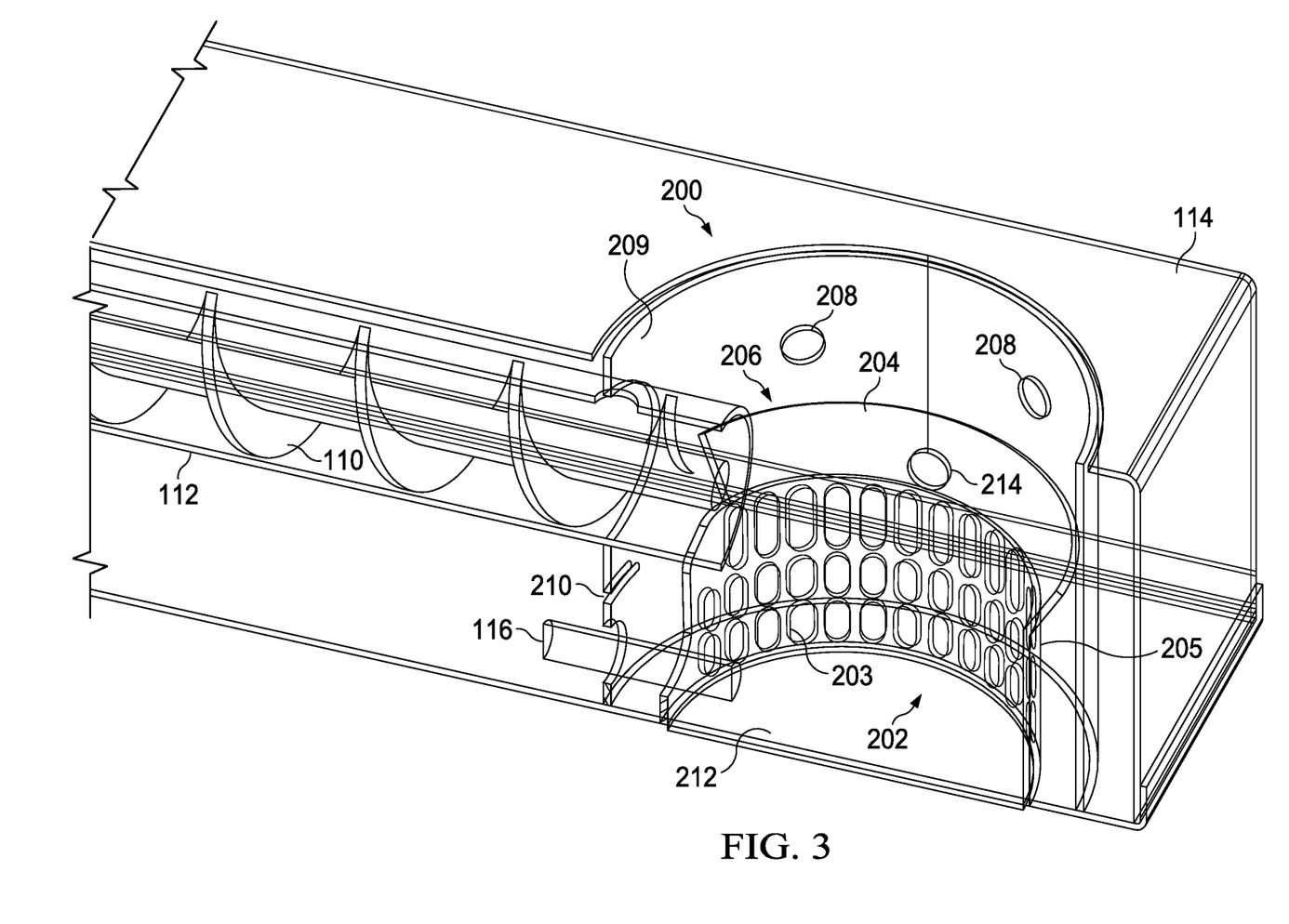
FIG. 3 is a perspective cutaway phantom view of the combustion chamber of FIG. 2.

Referring now to FIG. 2, a side cutaway view of a combustion chamber 200 for the pellet grill 100 or other device according to aspects of the present disclosure is shown. In various embodiments, the combustion chamber 200 is a replacement for the combustion chamber 120. In some embodiments, no further modifications to the grill 100 are made as the combustion chamber 200 is a "drop-in" replacement (though it is understood it may, nevertheless, be inserted, assembled, affixed in place, etc. during original production of the grill 100 or its relevant subcomponents). However, sizes of plenums 114, cooking grates 103, cooking chamber 102, etc. may be implemented to take full advantage of the combustion chamber 200. For further illustration, FIG. 3 is a perspective cutaway phantom view of the combustion chamber 200 of FIG. 2.

The combustion chamber 200 comprises an inner chamber 202 defined by an inner wall 205 or container for the burning fuel pellets. The inner wall 205 may be perforated as shown or may comprise other perforation configurations. The perforations 203 may be of such a variety of size and shape that they fully retain the fuel pellets while allowing pressurized combustion airflow to pass freely to the burning pellets inside the inner chamber 202. The perforations 203 may be very small in some cases, so as to define a screen. The inner chamber wall 205 may comprise a heat resistant material, such as a metal alloy, that can withstand extended high temperatures from the burning fuel pellets.

The inner chamber 202 may be cylindrical, toroidal, or prismatic in shape as is most advantageous to match with an outer chamber 206 that may be defined by an outer wall 209 or container. The inner chamber 202 and outer chamber 106 may be cylindrical and/or coaxial with respect to one another. A space 207 may be defined between the inner chamber 202 and outer chamber 206. The space 207 may be substantially toroidal such that the distance between the inner chamber 202 and outer chamber 206 is generally the same everywhere between them.

The outer chamber wall 209 may define openings or holes 208 that receive air from the plenum 114 driven or pressurized by the fan 115. The holes 208 defined by the outer chamber 206 may vary in size and spacing. In one embodiment, the holes 208 are defined vertically superior to the inner chamber 202. In some embodiments, a further set of holes 214 are defined through the outer chamber wall 209 to fully or partially vertically overlap with the inner chamber 202. A further series of holes 210 may be provided near the ignitor 116 to ensure proper ignition operations. The holes 214 and 210, like the holes 208, may be supplied with pressurized air from the plenum 114 driven by the fan 115.

The outer chamber 206 may be cylindrical in form, although other configurations are possible. The size of the inner chamber 202 (volumetrically or diametrically) may match the size of a single walled firepot seen in prior art. It may be of such a size to provide the thermal performance required by the grill 100 into which it is installed. In some embodiments, the outer chamber wall 209, at least, is sized larger than prior art firepots but aid in providing the benefits outlined herein as well as others.

In some embodiments, the inner chamber 202 shares a common floor 212 with the outer chamber 206. In some embodiments, the outer chamber 206 provides the floor 212 and the inner chamber 202 comprises a wall that sits on the floor 212 inside the outer chamber 206. An ash opening (also closable, not shown) may be provided into the combustion chamber 200 via the floor 212. The inner chamber 202 and the outer chamber 206 may have open tops. In some embodiments, the inner chamber 202 is shorter than the outer chamber 206 so as to fit completely inside the outer chamber 206.

The auger 110 and/or auger tube 112 may enter into the combustion chamber 200 via an opening through the outer chamber 206 and to an area above the inner chamber 202 such that pellets fall from the auger tube 112 into the inner chamber 202. The inner chamber 202 may have a funnel 204 on or near a top thereof to help prevent pellets from bouncing or falling out of the inner chamber 202.

Figure 4:
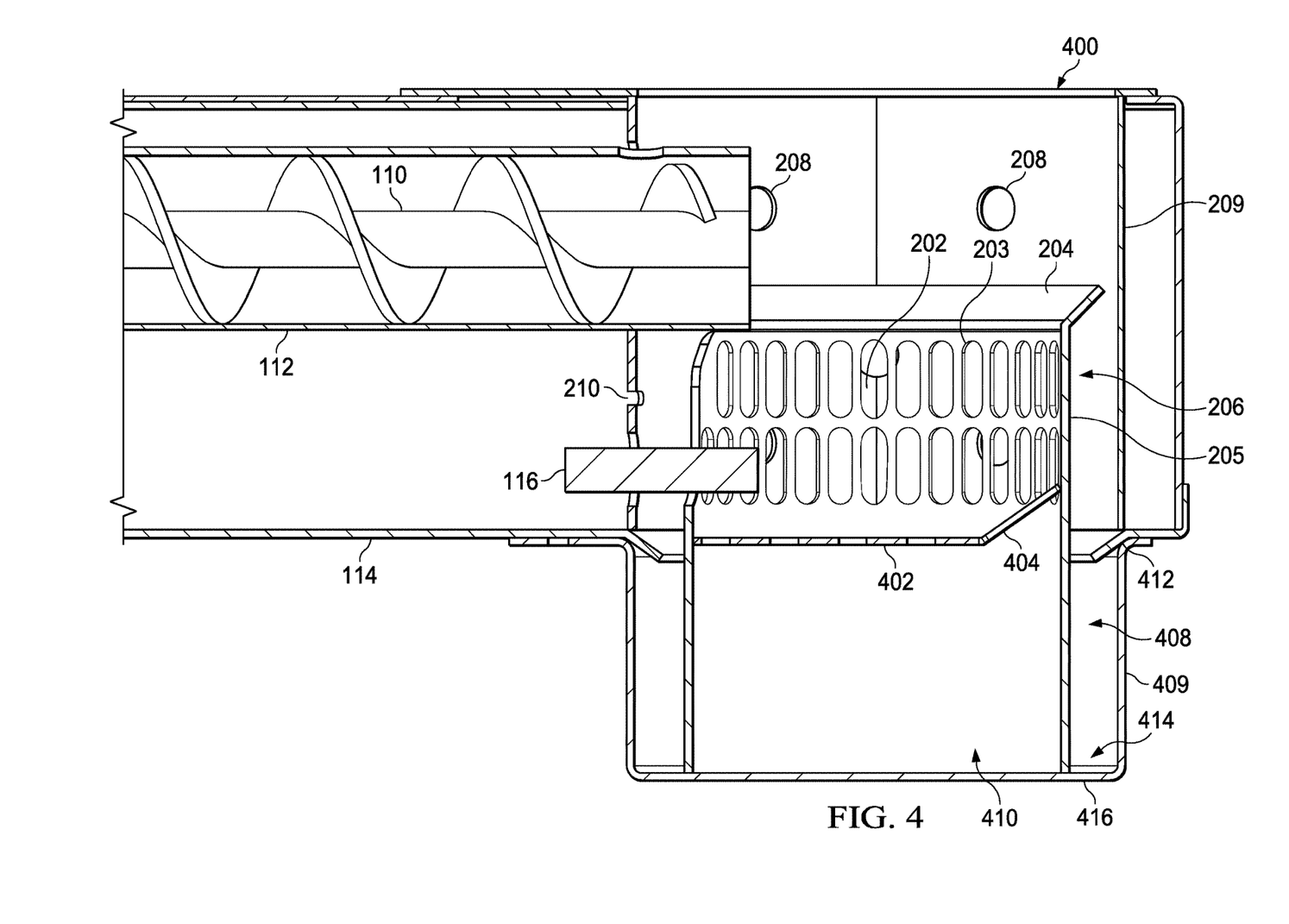
FIG. 4 is a side cutaway view of another embodiment of a combustion chamber for a pellet grill or other device according to aspects of the present disclosure.
Figure 5:
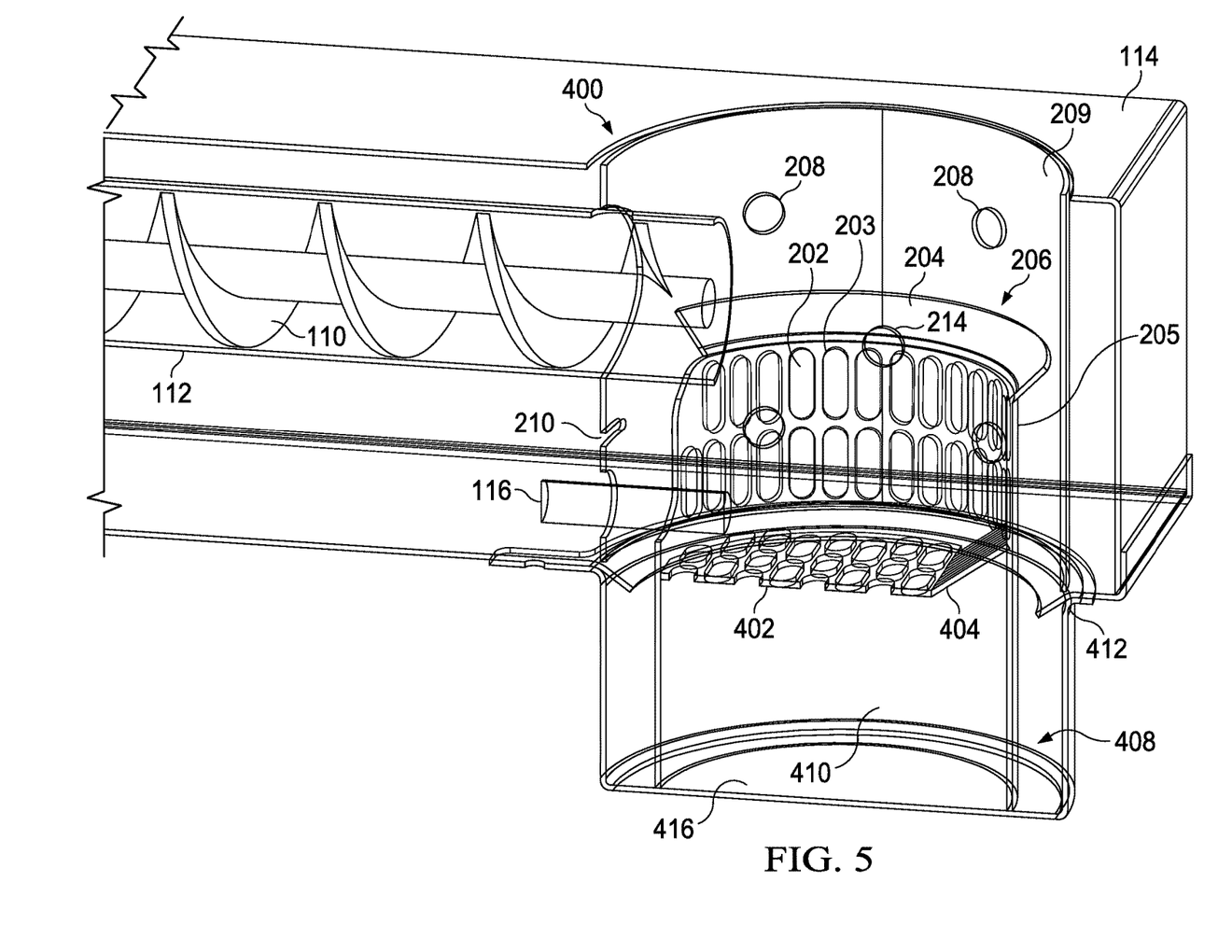
FIG. 5 is a perspective cutaway phantom view of the combustion chamber of FIG. 4.

Referring now to FIG. 4, a side cutaway view of another embodiment of a combustion chamber 400 for a pellet grill 100 or other device according to aspects of the present disclosure is shown. FIG. 5 is a perspective cutaway phantom view of the combustion chamber 400. There are some commonalities between the combustion chamber 400 and the combustion chamber 200 discussed above and components may be understood to be in common where not specified otherwise. Both combustion chambers 200, 400 (as well as combustion chamber 600, described below) are designed to solve various issues associated with prior art firepots, and both are upgrade, replacement, or OEM parts for solid fuel (e.g., pellet) grills.

The combustion chamber 400 provides an extension 408 chamber of the outer chamber 206 that may extend below the floor 402 and/or even the plenum 114. The extension chamber 408 may be defined by an outer wall extension 409, which may be integral with, or separately affixed with respect to, the outer wall 209. An inner chamber 202 may be taller or longer as well such that it extends all the way to or near to a floor 416 of the outer chamber extension 408 while maintaining its upper position relative to the outer chamber 206 and the auger tube 112.

The inner chamber 202 may be bifurcated by the perforated floor 402. The floor 402 may provide a surface for burning fuel pellets while allowing ash to drop into an ash chamber 410 below the floor 402. The ash chamber 410 may be defined by the portion of the inner chamber wall below the floor 402 in the present embodiment. The floor 402 may be perforated or have openings or screened portions to allow ash and other byproducts to fall through. The floor 402 may support unburned or burning solid fuel while ash is allowed to fall away such that it does not impeded further ongoing combustion.

The floor 402 may provide a ramped segment 404 opposite a side where the auger tube 112 lies over the floor 402. This may promote even distribution of the fuel pellets as they fall from the auger tube 112. The ramped segment 404 may be provided with an angle of about 45 degrees. In other embodiments, the angle may vary (for example, from about 30 degrees to about 60 degrees). As can be seen in the side cutaway view of FIG. 4 the ramped segment 404 may occupy less than half of the diameter of the inner 203 while the remainder of the floor 402 remains substantially flat. In some embodiments the ramped segment 404 comprises about 10-20% of the diameter of the inner chamber 202. In one embodiment the ramped segment 404 comprises about 17.6% of the diameter of the inner chamber 202 (all figures when viewed inside profile as shown).

Between the inner chamber 202 and outer chamber extension 408 (and possibly below the floor 402) is a trap 414. A lip 412 allows ash and stray pellets to fall into the trap 414 and away from the sides of the inner chamber 202 near the upper portion where combustion takes place. Thus ash, stray pellets, and/or other debris is prevented from accumulating around the inner chamber 202 where unimpeded airflow into the inner chamber 202 is desirable to promote proper fuel pellet burning. The trap 414 and ash trap 410 may be accessible by one or more closable openings (not shown) in the floor 416 or elsewhere.

Figure 6:
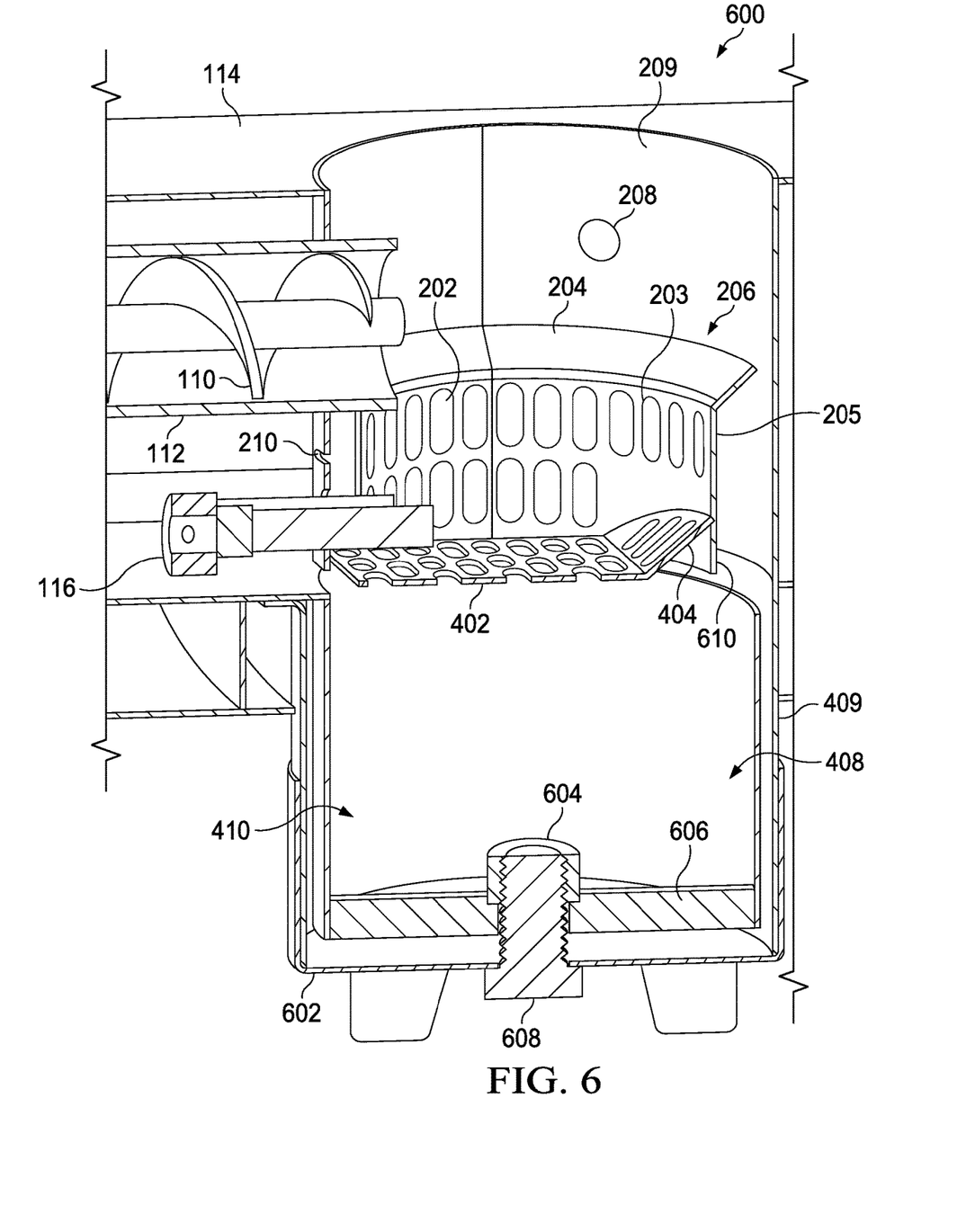
FIG. 6 is a perspective cutaway view of another embodiment of a combustion chamber according to aspects of the present disclosure.

Referring now to FIG. 6, a perspective cutaway view of another embodiment of a combustion chamber 600 according to aspects of the present disclosure is shown. The combustion chamber 600 shares common components with the combustion chambers 200, 400 unless otherwise indicated. The combustion chamber 600 may include an inner chamber 202 defined by an inner wall 205 located within an outer chamber 206 defined by outer wall 209. The inner chamber 202 may be coaxial with the outer chamber 206. The outer chamber wall 209 may be fitted into the plenum 114 to receive positive combustion air via one or more series of openings 208, 210, 214 to the plenum 114.

The inner wall 205 may be perforated or screened to allow air flow into the inner chamber 202 where the fuel pellets are burned after introduction via the auger tube 112. In this embodiment also, the floor 402 is perforated to allow ash and debris to fall through. A ramped segment 404 of the floor 402 is also provided. In the present embodiment, the inner wall 205 does not extend below the floor 402, rather the outer chamber extension 408 is an undivided compartment or ash chamber 410. Extending from a lower portion of the outer wall extension 209 is a brace 606 supporting a captive nut 604 or other fastener receiving implement. Here a removable bottom cap or cover 602 may be retained against the outer wall extension 409 by a bolt 608 into the nut 604. In some embodiments, the bolt 608 is captive to the bottom cover 608 such that the cover 608 may be screwed into the outer wall extension 409.

A support member 610, interposing the inner wall 205 and outer wall 209 to support the inner wall 205 in place relative to the outer wall 209 and/or extension 409. This may be instead of, or in addition to a lip 412 (FIGS. 4-5). The support member 610 may be annular where the inner chamber 202 and outer chamber 206 are cylindrical and coaxial. The support member 610 may be perforated to allow any spilled fuel pellets, ash, or other debris falling between the inner wall 205 and outer wall 209 location to pass through to the ash chamber 410 (defined here by the outer all extension 409). In other embodiments, the funnel 204 of the inner chamber wall 205 may extend to sufficient proximity with, or contact to, the outer wall 209 that it is not necessary to perforate the support area 610.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

The term "selective" or "selectively," unless otherwise indicated, is taken to mean that the operation or function is capable of being performed by the structure or device in reference, but the operation or function may not occur continuously or without interruption. Furthermore, a selective or selectively performed operation may be one that the user or operator of a device or method may choose whether or when to perform, but the function or operation is nevertheless fully operative on or within the relevant device, machine, or method.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A combustion chamber comprising:
   an inner wall defining an inner chamber, the inner wall being perforated to admit combustion air into the inner chamber;
   an outer wall defining an outer chamber contained in and surrounded by a pressured air plenum and extending upward beyond the inner wall to a top of the pressurized air plenum, the outer wall being perforated with a plurality of openings to admit combustion air from a pressurized air plenum surrounding the outer wall to the inner wall;
   wherein the inner and outer wall are equidistantly spaced apart such that air may flow between the inner and outer walls; and
   wherein the inner chamber has an open top and receives solid fuel for combustion in the inner chamber from an auger traversing through the pressurized air plenum and discharging the solid fuel above the elevation of the inner wall but below the top of the pressurized air plenum.

2. The combustion chamber of claim 1, further comprising a funnel above the inner chamber configured to direct solid fuel into the inner chamber.

3. The combustion chamber of claim 2, wherein the inner and outer chamber are bounded by a common floor.

4. The combustion chamber of claim 3, wherein the outer wall has perforations at least above the inner wall and on a same vertical level as the inner wall.

5. The combustion chamber of claim 4, wherein the outer wall has perforations vertically above the funnel.

6. The combustion chamber of claim 1, wherein the inner wall is cylindrical and joins to perforated floor in the inner chamber.

7. The combustion chamber of claim 6, further comprising a ramped segment of the perforated floor on an opposite side of the inner chamber from a location where the solid fuel is introduced.

8. The combustion chamber of claim 7, further comprising an ash chamber below the perforated floor.

9. The combustion chamber of claim 8, further comprising a lower outer chamber extension defined by a lower outer wall extension and containing the ash chamber therein.

10. The combustion chamber of claim 9, further comprising a spaced apart region between the ash chamber and the lower outer chamber extension with a lip extending inwardly to trap debris in the spaced apart region.

11. The combustion chamber of claim 8, further comprising a removable cap at a bottom end of the ash chamber.

* * * * *